United States Patent [19]

Gasparrini

[11] Patent Number: 4,856,427
[45] Date of Patent: Aug. 15, 1989

[54] INK METERING ASSEMBLY

[75] Inventor: Charles R. Gasparrini, Rye, N.Y.

[73] Assignee: Baldwin Technology Corp., Stamford, Conn.

[21] Appl. No.: 183,463

[22] Filed: Apr. 15, 1988

Related U.S. Application Data

[63] Continuation of Ser. No. 850,728, Apr. 11, 1986, abandoned.

[51] Int. Cl.$^4$ ............................................. B41F 31/00
[52] U.S. Cl. ...................................... 101/366; 101/484
[58] Field of Search ............... 101/366, 350, 365, 349, 101/363; 222/40, 26, 71; 73/1 H, 3; 418/150, 206, 205

[56]  References Cited

U.S. PATENT DOCUMENTS 2,081,906  6/1937  Ball ........................................ 101/366
3,762,324  10/1973  Ivary ................................. 101/DIG. 24
4,042,149  8/1977  Main ........................................ 222/40
4,511,316  4/1985  Ellis ..................................... 418/206 X Primary Examiner—J. Reed Fisher
Attorney, Agent, or Firm—St. Onge Steward Johnston & Reens

[57] ABSTRACT

A method and apparatus are described for metering the flow of ink fed under pressure to a printing press. A positive displacement gear meter is interposed in the feed line supplying the ink to the press. The flow of ink through the meter causes rotation of the gears. The rate of rotation is monitored by a sensing device incorporated in the meter housing which generates pulses indicative of gear teeth rotating past the device. The pulses are transmitted to a counter assembly which processes the same and provides a read out of the amount of ink passing through the meter.

12 Claims, 1 Drawing Sheet

4,856,427

INK METERING ASSEMBLY

This is a continuation of copending application Ser. No. 850,728, now abandoned, filed on Apr. 11, 1986.

BACKGROUND OF THE INVENTION

1. Field of the Invention

This invention relates to liquid metering devices for use in metering the flow of viscous fluids and is more particularly concerned with devices for metering the flow of ink being fed under pressure from a storage vessel to a printing press.

2. Description of the Prior Art

Fluid flow meters are well-known in the art and have been widely used to measure flow of liquids such as water, oil, fuels, hydraulic fluids and the like. Such meters include glass tube variable area meters, turbine meters, ultrasonic meters, coriolis effect meters and the like. However, such meters are generally unsatisfactory for use in metering the flow of relatively viscous materials such as printing inks which generally have viscosities in the range of about 100 to 200 poise.

Main U.S. Pat. 4,042,149 describes a liquid pump and metering system for use with hot asphalt, a relatively viscous material which is difficult to handle. The system employs a first positive displacement pump which is responsible for pumping fluid within the system and a second positive displacement pump through which the fluid is pumped in a direction which is the reverse of that in which the second pump would normally operate. The second pump acts as a metering device the rate of rotation of the rotatable portion of the pump being a measure of liquid flow therethrough. The rate of rotation in question is sensed by a device mounted on the exterior of the pump shaft and signals generated by the device are processed by electronic means to determine rate of fluid flow.

Krygeris U.S. Pat. 3,835,777 discloses a method of controlling ink supply to a printing press by employing sensors to monitor the density of ink being deposited on the material being printed. Signals generated by the sensors are compared with signals representing upper and lower limits of range of the desired density and control signals are derived to correct any deviation from the desired range.

Rodvelt U.S. Pat. 4,524,692 teaches controlling the amount of ink transferred to the ink train in a printing press. The system includes a fountain roller in contact with the ink supply and a ductor roller which can be moved between the ink train and fountain roller. The control mechanism involves sensing the interval of rotational movement of the fountain roller when in contact with the ductor roller as a measure of the amount of ink transferred to the ink train.

Fluid metering systems not specifically directed to use with viscous fluids such as ink but employing various types of sensing devices for detecting flow rates are disclosed in U.S. Pats. 4,520,677; 3,780,579; 3,906,198; 4,120,032; and 4,413,264.

It has now been found that the amount of relatively viscous fluids being supplied to a system, such as ink passing through feed lines such as those connecting a source of ink to a printing press, can be determined accurately and conveniently using a method and apparatus which will be described hereinbelow.

SUMMARY OF THE INVENTION

It is an object of the invention to provide a method and apparatus for monitoring the amount of a viscous fluid being passed under pressure in a feed-line.

It is an other object of the invention to provide a method and apparatus for measuring the amount of ink being fed under pressure in a feed-line to a printing press.

It is yet another object of the invention to provide an improved positive displacement gear meter for use in accurately metering liquids under pressure.

These objects, and other objects which will become apparent from the description which follows, are achieved by the method and apparatus of this invention. In its broadest aspect the method of the invention comprises a method of metering the flow of a relatively viscous liquid under pressure in a feed line. The method comprises the steps of:

interposing a positive displacement gear meter in the feed-line in which said liquid is flowing under pressure;

providing sensing means adjacent the gear teeth of said meter and adapted to generate pulses indicative of rotation of said gear teeth past said sensing device as said flow of liquid through said meter causes said gears to rotate; and processing said pulses in counter means to provide an indication of the amount of said fluid passing through said meter.

The apparatus of the invention in its broadest aspect comprises in combination:

a positive displacement gear meter having an inlet port and an exit port;

said inlet port being connected to a source of fluid under pressure;

said exit port being connected to the feedline to the location to which said fluid is being delivered;

sensing means incorporated in said positive displacement gear meter adjacent the gear teeth and adapted to generate pulses indicative of rotation of said teeth past said sensing means;

counter means operably connected to said sensing means for receiving said pulses and processing the same; and means operably connected to said counter means for displaying the amount of said fluid passing through said positive displacement gear meter.

DETAILED DESCRIPTION OF THE INVENTION

Figure 1:
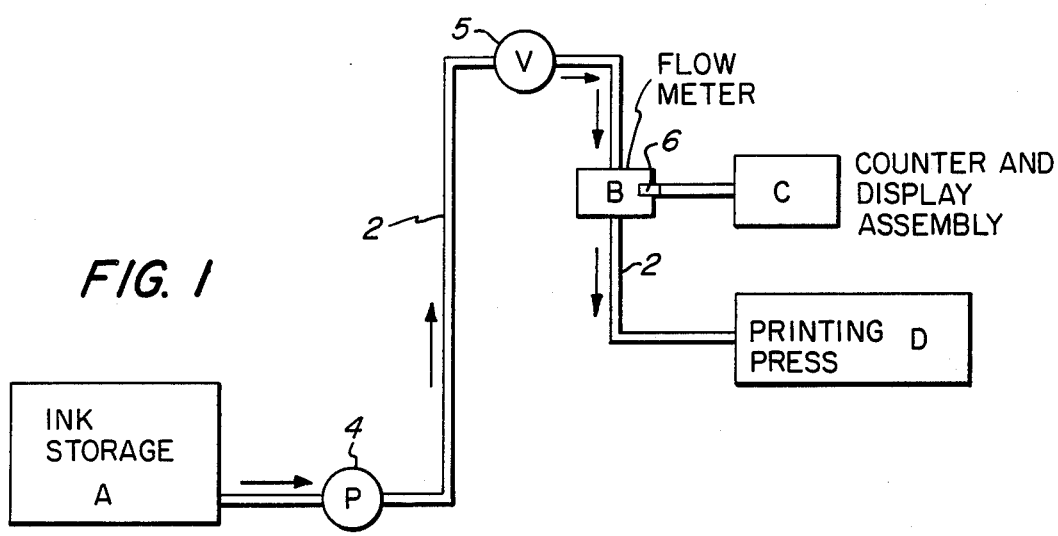
FIG. 1 is a schematic representation of a fluid metering system in accordance with the invention.

The invention will now be described by reference to the embodiments illustrated in the drawings.

Referring firstly to the schematic representation shown in FIG. 1 of a system in accordance with the invention for use in metering the flow of ink to a printing press, ink having a viscosity of the order of 100 poise to about 200 poise is pumped at a pressure of the order to about 2500 psi to about 3500 psi from an ink storage vessel A via pump 4 through feed-line 2 fitted with shut-off valve 5 and flow meter B to printing press D. Flow meter B comprises a positive displacement gear meter, which can be any such meter known in the art but is preferably a standard design positive displacement gear meter which preferably has been modified in the manner described hereinafter. The positive displacement gear meter is provided with a sensing device 6 which is located in the housing of said meter and positioned so that it senses the movement of the teeth on the gears of said meter as the latter are caused to rotate by passage of the ink under pressure through the meter.

Figure 2:
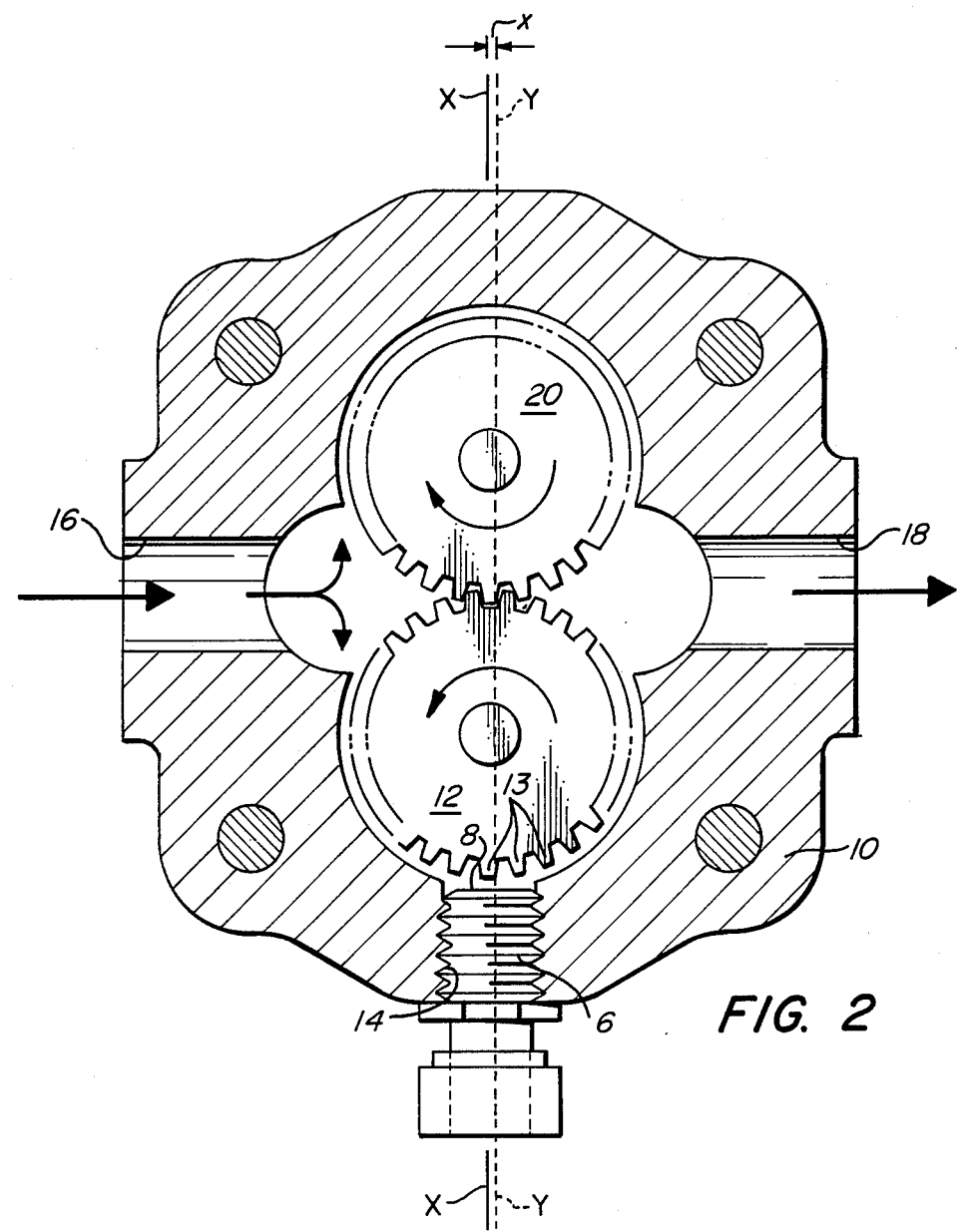
FIG. 2 is a cross-sectional view of the ink meter assembly of a system in accordance with the invention.

The location of sensing device 6 in the flow meter B is illustrated more fully in the cross-sectional view of a typical such meter in FIG. 2 which cross-section is taken along the longitudinal axis of the entry and exit ports of the meter and perpendicular to the axis of rotation of the gears. As shown in FIG. 2 sensor 6 is threadedly and sealingly mounted in channel 14 in meter housing 10 so that the leading edge 8 of the sensor 6 is in close peripheral proximity to the teeth 13 on the perimeter of gear 12. Ink under pressure is introduced via feed line 2 (not shown) through inlet port 16 and passes around the periphery of the intermeshing gears 12 and 20 thereby causing the latter to rotate in the directions indicated by curved arrows. The ink fluid exists via exit port 18 and feed-line 2 (not shown). The speed of rotation of gears 12 and 20 is directly proportional to the rate at which ink is flowing through the meter in the above manner. The rotation of teeth 13 on gear 12 past the sensor 6 is sensed by the latter. Advantageously sensor 6 is a magnetic pick up device and the teeth 13 have a ferrous metal content sufficient to be sensed by said pick up device. The magnetic pick up device can be any of those conventionally employed in the art. Illustrative of such devices is that which is available from Electro Products. The rotation of the teeth 13 past the sensor 6 generates a pulse train which has a frequency representative of the rate of rotation of the gears 12 and 20 and this in turn is related to the flow of ink through the meter. The pulse train generated in this manner is transmitted by appropriate circuitry to counter assembly C which records the pulses. The counter assembly can be programmed to factor the pulses to show an actual rate of flow through the meter i.e. in terms of amount by weight or volume per unit of time. Preferably the counter assembly records the pulses and factors them as a function of total throughput of ink by weight. The counter assembly C, preferably, has a direct readout device which displays visually the flow rate or total throughput whichever is so computed. Counter assembly C can be any of the devices conventionally employed for receiving and computing the pulse train received from the pickup device and accordingly the mode of operation and circuitry involved in such device need not be described herein in the interests of brevity. Illustrative of devices which are available commercially is the digital counter assembly marketed by Veeder Root Company.

In a particular embodiment of the invention the gear meter B is modified to improve the accuracy of the device by educing the potential for leakage between the face and sides of the gears. This is achieved in accordance with the invention by machining the center casting of the meter and the face width of the gears very close to each other. Further the center casting of the gear meter is preferably relieved by an offset of about 0.025±0.002 inches towards the outlet side i.e., towards the exit port 18 in FIG. 2. Thus the axis X—X shown in FIG. 2 is the axis of symmetry and the axis Y—Y represents the offset the two being separated by the distance x which is the amount of offset and preferably has the value set forth above. This offsetting of the center casting of gear meter B avoids jamming of the meter which can occur under the conditions of high pressure involved and also avoids the tendency towards leakage which is otherwise present. It is found that gear meters which have been modified in the above manner have consistently given accuracies ±0.5% of reading when employed in the system of the invention.

While the above embodiments of the invention have been shown in the context of metering ink being fed under pressure to printing presses it is to be understood that the invention is not limited in scope to such uses but can be employed with other liquid materials of relatively high viscosity which are being pumped through feed-lines under pressure. Further, whereas the invention has been described with reference to particular drawings the latter have been given for purposes of illustration only. As will be apparent to one skilled in the art modifications of the process and apparatus herein described can be made without departing from the scope of the present invention.

What is claimed is:

1. A method of metering ink being fed under pressure to a printing press, said method comprising the steps of:

interposing a positive displacement gear meter in the feed-line in which said ink is being delivered under pressure to said press, said meter having an inlet port, an exit port, and a chamber communicating with said inlet and exit ports and having intermeshing gears rotatably mounted therein;

feeding said ink via said inlet port into said chamber and around the periphery of said intermeshing gears and discharging said ink through said exit port of said meter;

said positive displacement gear meter being further characterized in that the axes of said intermeshing gears are offset, towards said exit port, from the axis of symmetry of said chamber;

providing sensing means adjacent the teeth of said intermeshing gears and adapted to generate pulses indicative of rotation of said gear teeth past said sensing means as said flow of ink causes said gears to rotate; and processing said pulses in counter means to provide an indication of the amount of said ink passing through said meter.

2. A method according to claim 1 wherein said sensing means comprises a magnetic pickup device and said gear teeth have a ferrous metal content sufficient to be sensed by said pickup device.

3. A method according to claim 1 wherein said sensing device is disposed within said positive displacement gear meter at a location on the periphery of one of the gears of said meter.

4. A method according to claim 1 wherein said counter means comprises a digital counting processor.

5. A method according to claim 1 wherein said amount of said ink is provided as a digital readout on monitor means associated with said counter means.

6. Apparatus for metering ink being fed under pressure to a printing press, said apparatus comprising in combination:

a positive displacement gear meter having an inlet port, an exit port and a chamber communicating with said inlet and exit ports and having intermeshing gears rotatably mounted therein;

said inlet port being connected to a source of ink under pressure;

said exit port being connected to the ink feed-line to said printing press;

said positive displacement gear meter being further characterized in that the axes of said intermeshing gears are offset, towards said exit port, from the axis of symmetry of said chamber;

sensing means mounted in said positive displacement gear meter adjacent the teeth of said intermeshing gears and adapted to generate pulses indicative of rotation of said teeth past said sensing means;

counter means operably connected to said sensing means for receiving said pulses and processing the same; and means operably connected to said counter means for displaying the amount of said ink passing through said positive displacement gear meter.

7. Apparatus according to claim 6 wherein said sensing means comprises a magnetic pickup device, and said gear teeth have a ferrous metal content sufficient to be sensed by said pickup device.

8. Apparatus according to claim 6 wherein said sensing means is disposed within said positive displacement gear meter at a location abutting the periphery of one of said gears of said meter.

9. Apparatus according to claim 6 wherein said counter means comprises a digital counting processor.

10. Apparatus according to claim 6 wherein said counter means also comprises a factoring means adapted to scale said pulses as amounts by weight corrected for specific gravity of the ink fluid.

11. A method of metering a viscous fluid being passed through a feed-line under pressure wherein said method comprises the steps of:

interposing a positive displacement gear meter in the feed-line in which said fluid is being transported;

said positive displacement gear meter having an inlet port, an exit port and a chamber communicating with said inlet and exit ports and having intermeshing gears rotatably mounted therein;

feeding said viscous fluid via said inlet port into said chamber and around the periphery of said intermeshing gears and discharging said viscous fluid through said exit port;

said positive displacement gear meter being further characterized in that the axes of said intermeshing gears are offset, towards said exit port, from the axis of symmetry of said chamber;

providing sensing means adjacent the teeth of said intermeshing gears and adapted to generate pulses indicative of rotation of said gear teeth past said sending means as said fluid causes said gears to rotate; and processing said pulses in counter means to provide an indication of amount of said fluid passing through said meter.

12. Apparatus for metering of a viscous fluid under pressure in a feed-line, said apparatus comprising in combination:

a positive displacement gear meter having an inlet port, an exit port and a chamber communicating with said inlet and exit ports and having intermeshing gears rotatably mounted therein;

said inlet port being adapted to be operably connected to the downstream segment of said feed-line and said exit port being adapted to be operably connected to the upstream segment of said feed-line;

said positive displacement gear meter being further characterized in that the axes said intermeshing gears are offset, towards said exit port, from the axis of symmetry of said chamber;

sensing means located in said positive displacement gear meter adjacent the teeth of said intermeshing gears and adapted to generate pluses indicative of rotation of said teeth past said sensing means; and counter means operably connected to said sensing means for receiving said pulses and processing the same; and means operably connected to said counter means displaying the amount of said fluid passing through said positive displacement gear meter.

* * * * *